United States Patent [19]

Dahl

[11] Patent Number: 4,849,646
[45] Date of Patent: Jul. 18, 1989

[54] AIR DRIVEN WHISTLE GENERATOR

[75] Inventor: Randy L. Dahl, Mesa, Ariz.

[73] Assignee: Motorola, Inc., Schaumburg, Ill.

[21] Appl. No.: 174,298

[22] Filed: Mar. 28, 1988

[51] Int. Cl.<sup>4</sup> .................. H02P 9/04; H02K 33/00
[52] U.S. Cl. ..................................... 290/1 R; 310/15; 310/36
[58] Field of Search ............... 290/1, 44, 55; 310/25, 310/15, 36, 38; 381/165, 192, 194

[56] References Cited

U.S. PATENT DOCUMENTS

| | | | |
|---|---|---|---|
| 3,674,946 | 7/1972 | Winey | 310/25 X |
| 2,895,063 | 7/1959 | Morris | 310/25 X |
| 3,783,310 | 1/1974 | Campagnuold et al. | 310/15 |
| 4,004,519 | 1/1977 | Hopkins | 102/70.2 G |
| 4,214,533 | 7/1980 | Fine et al. | 102/209 |
| 4,665,332 | 5/1987 | Meir | 310/77 |

Primary Examiner—William M. Shoop, Jr.
Assistant Examiner—Sharon D. Logan
Attorney, Agent, or Firm—Jordan C. Powell

[57] ABSTRACT

An air powered generator having only one moving part and no bearing surfaces comprises a whistle, an electric coil diagonally attached to the walls of the whistle, and a magnetic means which moves freely in a two-dimensional plane within the whistle. As air is forced into the whistle, the magnetic means oscillates back and forth with respect to the diagonally oriented electric coil to create an electric current in the same manner as an electric current is induced by passing a magnet in and out of a loop of wire.

4 Claims, 1 Drawing Sheet

AIR DRIVEN WHISTLE GENERATOR

BACKGROUND OF THE INVENTION

This invention relates, in general, to air driven electric generators, and more specifically, to simplistic air driven generators with minimal moving parts and no bearing surfaces.

Air driven generators generally use turbines or fans to convert the energy in a stream air entering the generator to electricity. These generators have several moving parts which necessarily rerquire bearing surfaces. The moving parts and bearing surfaces increase the probability of malfunction and breakdown as well as costs. To decrease this probability of malfunction, and further, to decrease costs, it is desirable to minimize the number of moving parts within the generator, preferably to one, and essentially eliminate bearing surfaces.

SUMMARY OF THE IVNENTION

It is, therefore, an object of the present invention to provide an air driven generator which has only one moving part and no bearing surfaces.

Another object of the present invention is to provide an air driven generator with a simple structure that is inexpensive to make.

To achieve these objects and advantages, a whistle-like generator is contemplated. This generator, constructed in substantially the same configuration as a referee's whistle, incorporates a coil of wire and an elongated magnetic means. The coil of wire is diagonally situated on the walls of the whistle and the elongated magnetic means freely moves about in a two-dimensional plane within the whistle's body in a manner similar to the pea in a referee's whistle. With the individual poles constantly changing position with respect to the diagonal coil, an electric current is induced in the coil.

Other objects and advantages of the present invention will become apparent from the following detailed description, particularly when considered in conjunction with the accompanying drawings.

DETAILED DESCRIPTION OF THE PREFERRED EMBODIMENT

Figure 1:
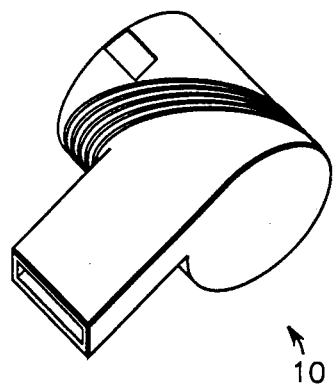
FIG. 1 is an isometric view of a whistle generator in accordance with the present invention.

A simplistic, air driven whistle generator 10 is shown in FIG. 1 in its preferred embodiment. Whistle generator 10, further shown in FIGS. 2 and 3, generally comprises air intake means 12, current generating element 14, and air outlet 16. Air intake means 12 is a hollow conduit secured to inlet aperture 18 of current generating element 14. Air outlet 16 is an aperture in current generating element 14.

Figure 2:
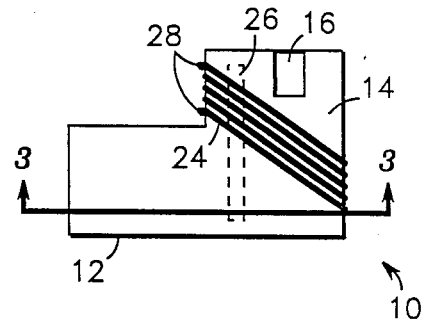
FIG. 2 is a top view of the whistle generator in accordance with the present invention.
Figure 3:
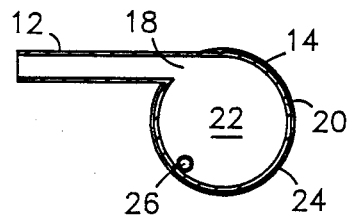
FIG. 3 is a cut-away side view of the whistle generator along line 3-3.
Figure 4:
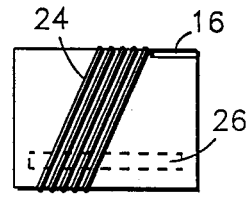
FIG. 4 is a back view of the whistle generator in accordance with the present invention.

Current generating element 14 comprises housing 20, chamber 22, electric coil 24, and magnetic means 26. Electric coil 24 is attached to the walls of housing 20. Electric coil 24 is constructed of a number of successive turns of a wire situated diagonally with respect to current generating element 14 as shown in FIGS. 2 and 4. Electric coil 24 further comprises a plurality of leads 28. Magnetic means 26 may be an elongated, light weight, magnetic tube or other elongated magnetic means. Magnetic means 26 extends from side-to-side of current generating element 14 allowing magnetic means 26 to move about freely within a two-dimensional plane with respect to the side of current generating element 14 as indicated in FIG. 3. Whistle generator 10 generally resembles a referee's whistle with magnetic means 26 acting similar to the pea or ball in the whistle.

Figure 5:
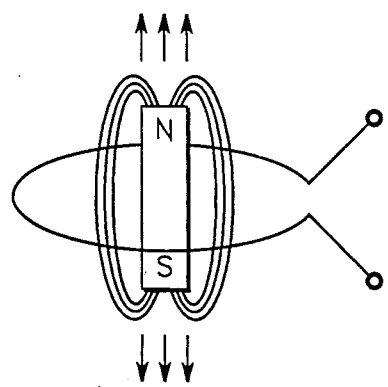
FIG. 5 depicts a magnet entering and exiting a loop of wire to induce an electric current.

In operation, a stream of air enters whistle generator 10 through air intake means 12. As the air enters chamber 22 from air intake means 12, it circulates causing magnetic means 26 to circulate. Since magnetic means 26 is restricted to a two-dimensional plane of motion, it tends to oscillate back and forth across diagonally situated electric coil 24 as shown in FIG. 2. As magnetic means 26 oscillates across electric coil 24, it causes an electric current within electric coil 24 due to a charge in an electromagnetic field in the same manner as a magnet entering and exiting a loop of wire will cause an induced current as shown in FIG. 5. The electric current created in electric coil 24 is fed to a load by plurality of leads 28. Although the magnetic field operating to create the electric current in electric coil 24 never goes to zero, the simplistic nature of whistle generator 10 ensures greater reliability and lower costs and eliminates all bearing surfaces. Whistle generator 10 is well suited for many applications.

Thus, an inexpensive, compact, air driven generator which has no bearing surfaces and only one moving part has been described throughout the specifications. While the invention has been described in conjunction with specific embodiments thereof, it is evident that many alternatives, modifications and variations will be apparent to those skilled in the art in light of the foregoing description. Accordingly, the invention is intended to embrace all such alternatives, modifications and variations as fall within the spirit and broad scope of the appended claims.

I claim:

1. An air driven generator comprising:
    housing means, said housing means being substantially hollow to form a chamber;
    said housing means including an air intake means and an air outlet means;
    said air intake means for supplying a stream of air to said chamber and said air outlet means for allowing said stream of air to escape said chamber;
    magnetic means for supplying a magnetic field;
    said housing means for enclosing said magnetic means;
    electric coil means for creating an electric current from said magnetic field, said electric current means angularly secured about said housing means; and
    said stream of air causing said magnetic means to randomly move about within said housing means and generally across said electric coil means to create an electromagnetic field across said electric coil means, said electromagnetic field generating said electric current within said electric coil means 2. An air driven generator according to claim 1 wherein said air intake means comprises a hollow conduit secured to said housing means and extending outwardly therefrom.

3. An air driven generator according to claim 1 wherein said magnetic means comprises an elongated magnetic tube.

4. An air driven generator comprising:
   a whistle shaped housing means including a chamber;
   electric coil means angularly secured about said whistle shaped housing means;
   magnetic means for supplying a magnetic field;
   said electric coil means for creating an electric current from said magnetic field;
   said magnetic means randomly driven about within said chamber by a current of air forced into said chamber to create an electromagnetic field across said electric coil means, said electromagnetic field generating said electric current in said electric coil means.

* * * * *